United States Patent Office 3,192,151
Patented June 29, 1965

3,192,151
REMOVAL OF METALLIC IMPURITIES FROM CRACKING CATALYSTS
James E. Connor, Jr., Wynnewood, and Joseph A. Cahill, Philadelphia, Pa., assignors to The Atlantic Refining Company, Philadelphia, Pa., a corporation of Pennsylvania
No Drawing. Filed Aug. 3, 1964, Ser. No. 387,220
16 Claims. (Cl. 208—120)

This invention relates to a method for the treatment of cracking catalysts which have become contaminated with coke-forming and gas-forming metallic impurities during use to improve the product distribution resulting from a hydrocarbon cracking process employing such catalysts. More particularly, it relates to a method for the removal of metallic impurities from silica-alumina cracking catalysts which have become contaminated with such impurities during the cracking of contaminated charge stocks.

This application is a continuation-in-part of our copending application, Serial No. 161,256, filed, December 21, 1961, now abandoned, entitled "Removal of Metallic Impurities From Cracking Catalysts."

For many years refiners have sought methods of cracking charge stocks highly contaminated with metal impurities such as nickel, iron and vanadium impurities. Specific examples of such stocks are reduced crudes and residual stocks which, if they could be cracked utilizing conventional gas oil cracking catalysts and equipment, could be converted to more desirable products such as gasoline and jet fuels. At present these stocks are suitable for use only as heavy industrial or marine fuels and therefore command a rather low price. In cracking such contaminated charge stocks with conventional hydrocarbon cracking catalysts such as silica-alumina, it has been found that the catalyst quickly becomes contaminated with deposits of the metallic impurities, thereby changing its hydrocarbon cracking characteristics and thus the product distribution resulting from the process so that large quantities of undesirable gas and coke are produced at the expense of desired products. Moreover, the conventional methods of catalyst regeneration by burning with air to remove the coke do not remove the metallic impurities and, accordingly, they build up on the catalyst to the extent where it becomes totally unfit for further use.

Various methods have been proposed for removing these metallic impurities from the catalyst such as washing with water, washing with acidulated water, treating with mineral acids, washing with aqueous solutions of inorganic salts and various combinations of these but none of these methods has been found to be successful.

A method now has been found whereby the metallic impurities deposited on a silica-alumina cracking catalyst during the cracking of highly contaminated charge stocks may be removed to such an extent that the original hydrocarbon cracking characteristics of the catalyst are substantially restored while the stability of the catalyst is maintained and the catalyst thereby rendered suitable for reuse in the cracking of highly contaminated charge stocks. Stated in other words, the coke-forming and gas-forming tendencies of the catalyst are reduced so that substantially the original product distribution resulting from the cracking process is restored by the method of this invention.

This method comprises separating at least a portion of the total silica-alumina cracking catalyst from the cracking process, contacting the separated catalyst at an elevated temperature with a gas containing free hydrogen, contacting the catalyst with a gas containing free oxygen, and thereafter with a suspension of a cation exchange resin in the hydrogen cycle in an aqueous medium to remove the metallic impurities from the catalyst. Finally, the decontaminated catalyst is separated from the resin, dried and returned to the cracking process.

It is an object of this invention to provide a method for treating a silica-alumina cracking catalyst which has been utilized in the cracking of a metal-contaminated charge stock to improve the hydrocarbon cracking characteristics of the catalyst and render it suitable for reuse in such a cracking process.

Another object of this invention is to provide a method for the removal of metallic impurities from silica-alumina cracking catalysts which have become contaminated with such impurities during use in the cracking of highly contaminated charge stocks.

It is another object of this invention to provide a method for the treatment of silica-alumina cracking catalysts which have become contaminated with coke-forming and gas-forming metallic impurities to remove such impurities from the catalyst while maintaining the stability of the catalyst.

Other objects of this invention will be apparent from the description and claims that follow.

In accordance with this invention a silica-alumina cracking catalyst which has become contaminated with coke-forming and gas-forming metallic impurities during the cracking of highly contaminated charge stocks is contacted with a non-oxidizing gas containing free hydrogen at a temperature in the range from 900° F. to 1400° F. The hydrogen treated catalyst is contacted with a gas containing free oxygen, for example, air or oxygen gas and thereafter the catalyst is contacted with a suspension of a cation exchange resin in the hydrogen cycle in an aqueous medium under conditions such that the coke-forming and gas-forming metallic impurities are removed from the catalyst while the steam and high temperature stability of the catalyst is maintained. The treated catalyst is separated from the resin and dried so that it may be returned to the cracking process for reuse.

The silica-alumina cracking catalysts which may be treated by the method of this invention include the wholly synthetic silica-alumina catalysts, the semi-synthetic silica-alumina catalysts, and the so-called natural catalysts. The wholly synthetic silica-alumina catalysts include those made by the well-known commercial methods such as coprecipitation or impregnation methods. Such catalysts contain from 7 percent by weight to 30 percent by weight of alumina with the remainder being silica. The semi-synthetic silica-alumina cracking catalysts may be produced by the addition of silica and alumina to a natural clay or an acid-treated clay to give alumina contents in the range of about 30 percent to 35 percent by weight of the finished catalyst. In the so-called natural catalysts, the natural clay may be acid treated only or alumina may be added to the acid-treated clay to give alumina contents ranging from about 15 percent to 50 percent by weight of the finished catalyst.

For purposes of clarity, the invention will be described in detail hereinafter with reference to powdered silica-alumina catalysts such as those employed in the so-called fluid catalytic cracking process.

In the practice of this invention a powdered silica-alumina catalyst such as that used in a fluid catalytic cracking process and which has become contaminated with substantial amounts of coke-forming and gas-forming metallic impurities during use in the cracking of metal contaminated charge stocks is initially fluidized with a gas such such as nitrogen. The catalyst while beng fluidized with the nitrogen is raised from room temperature to the desired reaction temperature which ranges from 900° F. to 1400° F. and preferably from 950° F.

to 1200° F. When the catalyst has reached the reaction temperature, the nitrogen is replaced by free hydrogen containing gas which is non-oxidizing, i.e. it may contain hydrocarbons, nitrogen, carbon dioxide and like gases which are non-oxidizing. The catalyst is contacted at the reaction temperature with the gas containing the free hydrogen for a time sufficient to reduce the metallic compounds deposited on the catalyst to the metal state. The length of time required for this reaction is dependent upon the quantity of contaminants deposited on the catalyst as well as the reaction temperature employed. Reaction periods as short as five minutes may be sufficient for less severely contaminated catalysts when reaction temperatures at the higher end of the range are utilized while with reaction temperatures at the lower end of the range, for example 950° F., and with relatively highly contaminated catalysts, reaction times as long as from 1 to 2 hours are preferred. In general, little advantage is obtained with contacting periods longer than about 2 to 3 hours. It is also preferred to carry out the contacting at atmospheric pressure or at pressures only slightly above atmospheric as required for fluidization but, in general, not in excess of about 50 p.s.i.g.

It is believed that during this contacting period the free hydrogen reduces to the metallic state those metallic impurities which are deposited on the surface of the catalyst. It is well known that some metallic impurities become buried within the structure of a silica-alumina catalyst by collapse of the pore structure during the alternate reaction and regeneration periods of the catalyst-use cycle. Such buried impurities do not contribute to the coke-forming and gas-forming tendencies of the catalyst. Thus, although most probably these impurities are not reduced during the hydrogen pretreatment step, this is immaterial to the operability of the instant invention since they are not deleterious to the cracking process.

After the hydrogen reducing step the catalyst is contacted with a free oxygen-containing gas such as air, pure oxygen, or oxygen diluted with inert gases such as nitrogen or carbon dioxide. It is believed that the reduced metal impurities are rapidly oxidized to the corresponding oxides during this step and it has been found that the oxides are more easily removable in the subsequent ion exchange step than are the reduced metals. It has been found preferable to cool the catalyst in a non-oxidizing atmosphere such as the hydrogen treating gas or an inert gas such as nitrogen to a temperature below about 750° F., preferably below about 450° F. or lower before contacting the catalyst with the oxygen since, if the oxidation is carried out at the elevated temperatures without the catalyst being cooled, the oxidation proceeds so rapidly that apparently some kind of sintering occurs which renders the metal oxides less susceptible to removal and thereby frequently defeats the purpose of the invention.

It has been found that compounds are formed by the hydrogen reduction and oxidation steps which are acidic. Consequently, when highly contaminated catalysts are being treated there may be a sufficient quantity of these acidic compounds present to lower the pH of the aqueous solution during cation exchange to an undesirable level. Therefore, in order to control the pH of the subsequent cation exchange step, it may prove desirable to first wash at least a portion of these compounds from the catalyst. A covenient method of washing consists of passing a stream of hot water (190° F. to 212° F.) in an upflow manner through the catalyst bed so that thorough contact of each part of the catalyst with the water is obtained. The water should not be passed up through the catalyst at such a rate that it will elutriate the finer portions of the catalyst from the coarser portions but, in general, a superficial velocity of one foot per minute is a convenient flow rate. The water washing is carried out until the desired pH has been reached. It has been found that only a very small portion of the total quantity of metal impurities deposited on the catalyst can be removed by water washing and the CPF remains prohibitively high so that the subsequent cation exchange step cannot be eliminated. The only function of the washing, therefore, is to permit operation of the subsequent cation exchange step within the preferred pH range of 2.7 to 4.2. If washing is omitted, there may be sufficient acidic compounds on the catalyst that the pH of the aqueous medium during cation exchange will be below 2.7, i.e. from 2.0 to 2.5, for example, which is within the operable but less preferred range as will be described.

Following the oxidation step, or washing step if it is employed, the catalyst is contacted with a suspension of a cation exchange resin in the hydrogen cycle in an aqueous medium at a pH ranging from 2.0 to 4.5. The contacting is carried out at a temperature in the range from 75° F. to the temperature at which the cation exchange resin disintegrates for from 1 to 24 hours with a catalyst to resin ratio preferably in the range from 0.25 gram to 3.0 grams per milliliter of wet cation exchange resin. It has been found necessary to control the pH within this range in order to remove the contaminating metals while substantially maintaining the steam stability and high temperature stability of the silica-alumina catalyst. After the catalyst has been contacted with the cation exchange resin, it is separated from the resin and dried for reuse.

For ease in handling the contacting of the catalyst with the cation exchange resin, the catalyst preferably should not constitute more than about 40 weight percent of the catalyst-water mixture and not less than about 10 percent by weight of the mixture. If the mixture contains more than 40 weight percent silica-alumina, when the required quantity of cation exchange resin is added thereto, the solids content of the mixture becomes too great to be handled readily, consequently, such mixtures are not desired. If the silica-alumina is present in concentrations of less than about 10 weight percent, the total volume which must be treated becomes exceedingly large and therefore such dilute mixtures are not preferred.

The aqueous mixture of the silica-alumina cracking catalyst of the hydrocarbon catalytic cracking process is contacted with solid particles of a cation exchange resin in the hydrogen cycle. It is desirable that the particles of the cation exchange resin be of a different size from the silica-alumina particles in order that after the contacting period the particles of cation exchange resin may be separated from the silica-alumina catalyst particles by simple conventional methods such as by screening or by elutriation. For example, it has been found that the particles of a silica-alumina catalyst which have been used in a fluid catalytic cracking unit may be separated readily from the particles of the cation exchange resin since the catalyst will pass through a 100 mesh U.S. Standard Sieve and the particle size of the cation exchange resin as produced commercially is in the range of 10 mesh, maximum, to 50 mesh, minimum, U.S. Standard Sieve.

The catalyst and resin may be contacted either in a continuous manner or batchwise. In either method it is important that the mixture be agitated thoroughly to provide intimate contacting between the resin and catalyst during the entire time of contact. Agitation with mechanical agitators may be employed or alternatively agitation with a gaseous medium such as steam or air may be utilized. When the contacting is carried out at elevated temperatures, heating may be accomplished by the use of jacketed vessels which may supply heat to the mixture from an external source or alternatively the heat may be supplied to the mixture by the steam agitation.

After the catalyst has been contacted with the cation exchange resin, it may be separated from the resin by any conventional method. One method is to separate the catalyst from the resin by elutriating the catalyst from the resin with an ascending aqueous stream. Another method involves separating the resin particles from the catalyst particles by screening. The quantity of cation exchange resin to be employed in contacting the silica-alumina is to some extent a function of the quantity of metallic impurities associated with the catalyst. However, in general, the quantity required in order to improve the hydrocarbon cracking characteristics of the silica-alumina catalyst is somewhat greater than the amount calculated solely on the basis of the quantity of metallic contaminants to be removed. In general, it has been found that the ratio of catalyst to cation exchange resin should range preferably between 0.25 gram to 3.0 grams of catalyst per milliliter of wet cation exchange resin although somewhat higher ratios have been found to be suitable.

One mode of carrying out the process of the instant invention is to remove all of the catalyst from the catalytic cracking unit and contact the total quantity of used catalyst contained in the unit according to the process of the invention to remove the coke-forming and gas-forming metal contaminants from the catalyst. After treatment the catalyst is replaced in the unit. This mode of operation requires that the cracking unit be shut down and hence it is most applicable when the unit is shut down for mechanical overhauling. This mode can be carried out only on a periodic basic with long intervals between treatments and, accordingly, it is not preferred.

The preferred mode of carrying out the process of the instant invention is to separate a portion of the catalyst currently in use in the cracking process from the cracking unit without interrupting the operation of the unit. This may be carried out by continuously removing catalyst from some convenient location in the unit, for example, from the dense phase in the regenerator. After treatment the catalyst may be returned continuously to the unit. If desired, however, batches of catalyst may be removed on a periodic basis, for example, once a shift, once a day, or less frequently. In either case the portion of the catalyst being treated may be expressed in weight percent of the total quantity of the catalyst being employed in the cracking process per unit of time, normally per day. In the cracking of residual materials which are highly contaminated it is generally required that amounts ranging from 10 percent to 40 percent of the total catalyst in the unit be treated per day. Amounts ranging between 20 percent and 25 percent have been found to be particularly suitable. If, however, the level of contaminants in the charge should decrease because of cleaner charge stocks or if the refiner should determine that a somewhat higher level of contamination on the catalyst is suitable for his individual purposes, smaller quantities of catalyst may be treated, for example, 5 percent of the total catalyst in the unit per day may be treated. If large amounts of catalyst are being treated per day, it may be necessary to increase the total amount of catalyst being employed in the process in order to maintain the proper quantity of catalyst in the unit.

In the preferred mode of operation, a portion of the catalyst is continuously removed and treated so that the contamination is reduced to a low level and thus the desired improvement in the hydrocarbon cracking characteristics of the cracking catalyst is obtained.

The cation exchange resins suitable for the method of this invention are the commercially available strong acid synthetic type cation exchanger resins such as Amberlite IR–120 or Permutit-Q which are produced by the sulfonation of the copolymer prepared from a mixture of styrene and divinylbenzene. Amberlite IR–120 and Permutit-Q are well known to the art of ion exchange and their preparation is described in detail in both the patented art and in the technical literature, in particular, the detailed method of their preparation is set forth starting with the first full paragraph on page 84 of the book by Robert Kunin, entitled "Ion Exchange Resin," second edition, John Wiley and Sons, Inc., New York (1958).

The cation exchange resins as manufactured and shipped are wet with water and are used in this condition. When at least a portion of the ion exchange capacity of the cation exchange resin has become saturated by the cations removed from the catalyst, the exchanger is regenerated by acid treatment in accordance with conventional methods recommended by the manufacturer. Generally the resin after each contact with the catalyst is regenerated even though its exchange capacity may be only partially saturated in order to insure that in the next cycle there is present the above-mentioned required excess of the resin in the hydrogen cycle. However, when the quantities of contaminants on the catalyst are low, it may be found unnecessary to regenerate all of the resin after each contact with the catalyst.

Since the commercialization of the catalytic cracking process, a number of laboratory tests have been developed which have been proved to measure accurately the properties of the catalyst when used in these commercial units.

The hydrocarbon cracking activity of the catalysts treated by the process of this invention was measured by the distillate-plus-loss (D+L) scale according to the method of Birkhimer et al. which is set forth in "A Bench Scale Test Method for Evaluating Cracking Catalysts," Proceedings of the American Petroleum Institute, Division of Refining, volume 27 (III), page 90 (1947). According to the Birkhimer et al. D+L scale for the measurement of activity of the cracking catalyst utilizing 200 grams of catalyst in the test, it would be possible to have a theoretical maximum D+L of 100; however, in general, the maximum D+L for a fresh synthetic silica-alumina cracking catalyst will range between 90 and 95.

The hydrocarbon cracking characteristics of the catalysts treated in accordance with the process of this invention were determined by measuring the carbon producing tendencies of such catalysts according to the 40-gram method set forth in the aforementioned Birkhimer et al. article and also described in the article by J. J. Rothrock et al., entitled "Fluid Cracking Catalyst Contamination, Development of a Contaminant Test," Industrial and Engineering Chemistry, volume 49, page 272 (1957). According to this method the carbon producing tendencies of the catalyst are expressed as the carbon producing factor (CPF). Carbon producing factor is defined as the ratio of carbon produced from a standard feed stock with a catalyst under test compared to the carbon produced from the same material from a standard catalyst at the same conversion level. Hence, a carbon producing factor of 3 means that the metal contaminated catalyst in question produces three times as much carbon as a standard uncontaminated fresh catalyst at the same conversion. Thus, in measuring carbon producing factors each catalyst was tested by employing a standard charge stock under standard conditions in accordance with the Birkhimer et al. method and compared with a standard catalyst tested with an identical feed stock under identical conditions. Consequently the carbon producing factors of the catalysts tested are comparable one to the other and are comparable to the standard catalyst which is a commercial, fresh, uncontaminated synthetic silica-alumina cracking catalyst containing approximately 13 percent by weight of alumina and 87 percent by weight of silica and which has a carbon producing factor (CPF) of 1.0 at all conversion levels by definition. A more detailed explanation of CPF is set forth in the paper by H. R. Grane, J. E. Connor, Jr., and G. P. Masologites entitled "The Behavior of Metal Contaminants in Catalytic Cracking," Preprints of Papers Presented May 11, 1961, at 26th Midyear Meeting of the American Petroleum Institute's Division of Refining at Houston, Texas. It is preferred that after treatment according to the process of this invention the CPF have a value as near to 1.0 as possible, in general, not greater than about 1.5 to 1.6 although for economic reasons when highly contaminated charge stocks are being cracked it may be deemed sufficient to reduce the CPF to a somewhat lesser extent, for example to 2.3–2.4.

In addition to the activity and coke-producing properties of a commercial cracking catalyst, the stability of such a catalyst to deactivation under conditions encountered in the commercial unit is also important. Specifically, these conditions are steam and high temperatures. The catalyst is subjected to steaming in the stripping section and in the regeneration zone of the unit and also encounters elevated temperatures in the order of 1150° F. or higher in the regeneration zone. Both of these factors have a deactivating effect on the catalyst. The stability of the catalyst toward steam is measured by determining the D+L of the catalyst both prior to and after steaming at 1050° F. The loss in D+L gives a measure of stability. Similarly, the loss in D+L when the catalyst is heated to 1700° F. in air gives a measure of its high temperature stability.

One of the important variables of the ion exchange contacting step is the pH of the aqueous medium. It has been found, utilizing the aforementioned stability tests, that at a pH above about 2.7 the catalyst may be decontaminated without deleteriously affecting the steam stability and high temperature stability although a pH of as low as 2.0 may be employed since in the range of 2.0 pH to 2.7 pH the stability of the catalyst is substantially, although not completely, maintained. The upper pH limit is determined by the quantity of coke-forming and gas-forming metal contaminants which can be removed. If the pH is too high the quantity of such contaminants thus removed is so low that little or no improvement in the hydrocarbon cracking characteristics will be obtained. Consequently, it has been found necessary to have a pH below about 4.5 and preferably below 4.2 in order to remove sufficient coke-forming and gas-forming metal contaminants to improve the hydrocarbon cracking characteristics of the catalyst. Accordingly, the catalyst may be contacted with the cation exchange resin in an aqueous medium having a pH in the range of 2.0 to 4.5 and preferably within the range of 2.7 to 4.2. In order to attain the desired pH during the contacting period between the cation exchange resin and the catalyst, it may be necessary to provide the required acidity by adding an acid. The preferred acid is sulfuric, however, hydrochloric, oxalic, citric, tartaric and similar acids have been found to be suitable for controlling the pH of the aqueous medium during the contacting period. The acid may be added either to the resin slurry before the catalyst is added or the acid may be added in increments during the contacting period in order to maintain a somewhat more constant pH.

The temperature of contacting the catalyst with the cation exchange resin may range from about 75° F. to the temperature at which the cation exchange resin disintegrates. Cation exchange resins will generally withstand temperatures within the range of 250° F. to 260° F. and certain heat resistant cation exchangers will withstand higher temperatures. When operating at these higher temperatures, it is necessary, of course, to employ superatmospheric pressures to keep the aqueous medium in the liquid phase.

It is necessary to use longer contacting periods when employing temperatures at the lower end of the range than when employing moderately elevated temperatures such as 120° F. and higher. Thus, at 75° F. contact periods as long as 24 hours are required to obtain the same improvement to the catalyst as may be obtained with contact periods of only 2 or 3 hours at the higher temperatures. In general, contact periods of at least one hour and preferably 2 hours should be used for temperatures in the range of 120° F. to the disintegration temperature of the resin. The preferred contact temperatures range from 120° F. to 250° F. and the preferred contact periods from 2 to 8 hours.

It will be recognized that mildly contaminated catalysts require less severe conditions and heavily contaminated catalysts will require somewhat more severe conditions although the ranges set forth are suitable for the vast majority of commercial operations.

The following examples are provided for the purpose of illustrating certain specific embodiments and critical features of the invention and to show the utility of the invention.

In order to demonstrate the effect of reaction condition variables on the process, a standard contaminated catalyst was employed. A fresh commercial synthetic silica-alumina catalyst (approximately 13 weight percent alumina, 87 weight percent silica) of the type employed in fluid catalytic cracking units having a particle size such that it passed through a 100 mesh U.S. Standard Sieve, was artificially deactivated and contaminated. The deactivation was carried out by steam treatment at 1050° F. for 18 hours under 30 p.s.i.g. steam pressure to remove approximately one-third of the cracking activity of the catalyst, i.e. it had a D+L of 60 as measured by the Birkhimer et al. method. The deactivated catalyst samples were contaminated with nickel by heating the catalyst to 700° F. and contacting the catalyst with a solution of nickel naphthenate in furnace oil whereby nickel compounds become deposited on the catalyst. The details of this method of contamination are set forth in the aforementioned article by J. J. Rothrock et al. The contacting was continued until approximately 0.5 weight percent nickel had been deposited on each catalyst sample. The nickel deposited on the catalyst in the form of carbonaceous compounds was calculated on the basis of nickel metal. Each catalyst sample therefore corresponded to a highly contaminated used silica-alumina cracking catalyst. These standard contaminated catalyst samples containing 0.5 weight percent nickel had a carbon producing factor (CPF) of 20.

EXAMPLE I

A sample of the standard deactivated silica-alumina catalyst contaminated with 0.5 weight percent nickel prepared as described was contacted with Permutit-Q cation exchange resin in water suspension for 4 hours under reflux conditions (212° F.) at a pH of 2.9. The ratio of catalyst to resin was 0.5 gram of catalyst per milliliter of wet cation exchange resin. The resin was separated from the catalyst by screening and was dried. The nickel content of the catalyst had been reduced to 0.37 weight percent and the carbon producing factor of the catalyst was found to be 11, showing that whereas some improvement had been made, the catalyst was of no commercial value.

EXAMPLE II

A sample of the standard deactivated and contaminated silica-alumina catalyst prepared as has been described was heated in a nitrogen stream to 950° F. under atmospheric pressure. The nitrogen was replaced by a stream of hydrogen and the contacting with hydrogen was continued at 950° F. for two hours. The hydrogen was replaced by nitrogen and the carbon producing factor of the catalyst was determined. It was found to be 18, showing that the hydrogen treatment had not decontaminated the catalyst since the carbon producing factor was substantially unchanged.

EXAMPLE III

A sample of the standard deactivated and contaminated silica-alumina catalyst prepared as has been described was fluidized with nitrogen and heated while fluidized to 950° F. under atmospheric pressure. The nitrogen was replaced by a stream of hydrogen and the contacting with hydrogen was continued at 950° F. for two hours. The hydrogen was replaced with nitrogen and the catalyst cooled to room temperature at which temperature the fluidization was discontinued and the catalyst allowed to come into contact with air. The catalyst was washed for about eight hours with a stream of demineralized water and then was contacted with Permutit-Q cation exchange resin in the same manner and under the same conditions as described in Example I except that the pH of the aqueous solution during the treatment was 3.1. After separation of the catalyst from the resin by screening and drying, the nickel content of the catalyst was found to be 0.034 weight percent and the CPF 1.0, demonstrating that, when compared with Example I, the treatment with hydrogen and oxygen prior to ion exchange is critical for the production of a catalyst having the desired hydrocarbon cracking characteristics.

EXAMPLE IV

In another experiment the standard deactivated and contaminated silica-alumina catalyst prepared as has been described was pelleted into cylindrical pellets measuring approximately ⅛-inch in diameter by ⅛-inch in thickness. The pelleted catalyst was placed in a fixed bed and heated in a nitrogen atmosphere to a temperature of 950° F. At this temperature the nitrogen was replaced by a stream of hydrogen and the contacting with hydrogen was continued for two hours. The pelleted catalyst was then cooled in nitrogen to room temperature and ground in air. The powder that passed through a 100 mesh U.S. Standard Sieve was contacted (without being washed) with ion exchange resin in the same manner as described in Examples I and III with the pH of the aqueous solution being 2.9. After separating the catalyst from the resin and drying, the catalyst was found to have a nickel content of 0.05 weight percent and a CPF of 1.18. This experiment demonstrates that the hydrogen and oxygen pretreatment may be applied to pelleted catalysts.

EXAMPLE V

In order to demonstrate the criticality of the oxidation step to produce a catalyst having the desired hydrocarbon cracking characteristics, five portions of the standard deactivated and contaminated silica-alumina catalyst were subjected to a pretreatment process in which the oxidation step was omitted. In these experiments the catalyst was fluidized in hydrogen and heated to a temperature of 950° F. The contacting with hydrogen at this temperature was continued for two hours. At the end of two hours the heating was discontinued and the catalyst was allowed to cool while being fluidized with hydrogen to insure that a reducing atmosphere would be present at all times. The cooling was continued to approximately the temperature of the ion exchange treatment step and when the catalyst reached this temperature it was dropped into the cation resin aqueous slurry which had been and was being purged with nitrogen. Thus, the catalyst did not at any time come into contact with oxygen. In each experiment the catalyst was contacted with the cation exchange resin for four hours at 212° F. at a catalyst to resin ratio of approximately 0.5 gram of catalyst per milliliter of wet resin. In the first three experiments the cation exchange resin contacting step was carried out at a pH of 2.9. The catalyst samples were separated from the resin, dried, and analyzed. The first sample had a nickel content of 0.064 weight percent and a CPF of 1.86. The second sample had a nickel content of 0.05 weight percent and a CPF of 2.5. The third sample had a nickel content of 0.07 weight percent and a CPF of 2.6. The two other experiments were carried out in exactly the same manner except that in one the pH of the ion exchange treat was 2.7 and in the other the pH was 3.4. The catalyst resulting from the 2.7 pH treat had a nickel content of 0.065 weight percent and a CPF of 1.9. The catalyst resulting from the 3.4 pH treat had a nickel content of 0.06 weight percent and a CPF of 2.4. These experiments demonstrate that although the nickel content of the catalyst is lowered to a value only slightly above that obtained when the oxidation step is present, apparently the very small quantity of nickel which is not removed is exceedingly active and therefore has an exceedingly marked effect on the hydrocarbon cracking characteristics of the catalyst. It is theorized that the metal which is not removed because of the omission of the oxidation step may be located on the catalyst in such a manner as to produce extremely active sites for the cracking of hydrocarbons with the result that the hydrocarbons are converted to coke.

EXAMPLE VI

In order to demonstrate the effect of time of hydrogen contacting, two samples of the standard deactivated and contaminated silica-alumina catalyst were treated in the same manner as in Example III except that the hydrogen contact time in the first experiment was 15 minutes and in the second experiment one hour. The pH of the aqueous solution during the cation exchange contacting period was 2.9 in both experiments. With the 15-minute hydrogen contacting time the treated catalyst had a nickel content of 0.065 weight percent and a CPF of 3.9. With the one-hour hydrogen contacting time the treated catalyst had a nickel content of 0.04 weight percent and a CPF of 1.0. These experiments demonstrate that at a particular level of contamination there is a minimum time of hydrogen contact which must be employed in order to completely reduce the metal on the catalyst. With lower levels of contamination or with contact temperatures at the higher end of the range, the minimum contact time has been found to be somewhat shorter.

EXAMPLE VII

The effect of low temperatures during the hydrogen contacting step was demonstrated by carrying out a series of experiments on several samples of the standard deactivated and contaminated silica-alumina catalyst. The runs were carried out in the manner described in Example III with the temperature of the contacting step being varied as shown in Table I. The conditions and results for each experiment are also set forth in Table I.

*Table I*

| Conditions of treatment | | Cation exchanger pH of aqueous solution | Analysis of treated catalyst | |
|---|---|---|---|---|
| Hydrogen reduction | | | Weight percent Ni | CPF |
| Temp., ° F. | Time, hrs. | | | |
| 250 | 2.0 | 2.8 | 0.23 | 7.7 |
| 450 | 2.0 | 3.1 | 0.39 | 10.2 |
| 750 | 2.0 | 3.1 | 0.13 | 9.6 |
| 950 | 1.0 | 2.9 | 0.042 | 1.0 |
| 950 | 2.0 | *2.5 | 0.045 | 0.9 |
| 1,050 | 2.0 | *2.6 | 0.08 | 0.8 |

*Catalyst not washed prior to cation exchange.

It will be seen from these data that the minimum temperature which can be employed is about 900° F.

In order to study the effect of high temperatures during the hydrogen contacting step a second series of experiments was carried out on the standard deactivated silica-alumina catalyst base which, however, when contaminated with nickel resulted in a deposition of 0.48 weight percent nickel and had a carbon producing factor of 13. In these experiments the carbon producing factor was determined on a 5-gram catalyst sample which numbers in this range differ from the 40-gram test numbers by 0.1 to 0.2. In order, therefore, to render the data completely comparable these numbers were corrected by known standard correlation curves. The runs were carried out in the manner described in Example III with the temperature of the hydrogen contacting step, the other conditions and the results for each experiment being set forth in Table II.

Table II

| Conditions of treatment | | | Analysis of treated catalyst | |
|---|---|---|---|---|
| Hydrogen reduction | | Cation exchanger pH of aqueous solution | Weight percent Ni | CPF |
| Temp., °F. | Time, hrs. | | | |
| 1,200 | 0.25 | 3.2 | 0.057 | 1.8 |
| 1,200 | 2.0 | 3.25 | 0.03 | 1.3 |
| 1,400 | 0.25 | 3.1 | 0.055 | 2.05 |
| 1,400 | 2.0 | 3.3 | 0.06 | 2.25 |

It will be apparent from these data that higher temperatures permit shorter contact times, but that at 1400° F. the carbon producing factor of the catalyst has been reduced to a value which is at the upper limit of the range of suitability. Furthermore, contacting temperatures above this range are not desirable since they may damage the catalyst solely by thermal effects.

EXAMPLE VIII

The effect of the hydrogen purity was determined by carrying out two treatments on two samples of the standard deactivated and contaminated silica-alumina catalyst utilizing hydrogen produced in commercial catalytic reforming processes.

In the first experiment, which was carried out in the same manner as set forth in Example III except that a pH of 2.7 was utilized, the hydrogen stream consisted of 90.5 mole percent hydrogen and 9.5 mole percent $C_1$ to $C_5$ hydrocarbons. The catalyst after treatment contained 0.05 weight percent nickel and had a CPF of 0.90. In the second experiment, a pH of 3.1 was utilized during the ion exchange treatment and the hydrogen stream consisted of 88.6 mole percent hydrogen, 11.1 mole percent $C_1$ to $C_5$ hydrocarbons, together with 0.3 weight percent nitrogen. The catalyst after treatment was found to have a nickel content of approximately 0.04 weight percent and a CPF of 0.9. These results show that the hydrogen reduction may be carried out in the presence of hydrocarbons. It should be noted, however, that the quantity of hydrogen in the hydrogen-hydrocarbon mixture should not be so great that the hydrocarbons enter into the reduction process. If the hydrocarbons furnish any of the hydrogen for reduction, coke will be deposited on the catalyst, particularly on the sites of the metal impurities and thus render the metals less susceptible to removal in the subsequent ion exchange treatment. The hydrogen may be mixed with other non-oxidizing gases such as nitrogen, carbon dioxide and the like wherein the free hydrogen in the stream is considerably more dilute, as will be shown in a subsequent example.

EXAMPLE IX

A fresh commercial silica-alumina catalyst of the type utilized in fluidized cracking processes containing approximately 13 weight percent alumina and 87 weight percent silica was charged to a semi-plant scale catalytic cracking unit. A West Texas-Permian reduced crude of 884° F. mid-boiling point, 20.5° API gravity and with a 4.5 Ramsbottom carbon, was passed over the catalyst until the catalyst had a CPF of 11.9, an iron content of 0.26 weight percent, a nickel content of 0.11 weight percent and a vanadium content of 0.26 weight percent. This catalyst was contacted with Permutit-Q exchange resin in the same manner as described in Example I except that a pH of 2.75 was employed. After the catalyst had been separated from the resin and dried, it was found to have an iron content of 1.5 weight percent, a nickel content of 0.07 weight percent, and a vanadium content of 0.056 weight percent with a CPF of 4.2. Another portion of the contaminated catalyst was treated with hydrogen, air, and cation exchange in the same manner as described in Example III except that the catalyst was not washed prior to cation exchange and the pH of the aqueous medium during the cation exchange step was 2.9. The catalyst after being separated from the resin and dried was found to have an iron content of 0.08 weight percent, a nickel content of 0.54 weight percent, and a vanadium content of 0.04 weight percent with a CPF factor of 1.37. These data show the criticality of utilizing the hydrogen treatment and oxidation step prior to ion exchange in order to give the desired improvement of the hydrocarbon cracking characteristics of a catalyst contaminated during use in the cracking of highly contaminated charge stocks.

EXAMPLE X

The catalyst of Example IX which had been subjected to cation exchange treatment only, and had a carbon producing factor of 4.2 was subjected to the same treatment as the catalyst in Example III with hydrogen reduction and with oxidation, but was not water washed prior to the cation exchange. The pH of the aqueous medium in the cation exchange step was 2.6. The dried, treated catalyst had an iron content of 0.065 wt. percent, a nickel and a vanadium content of 0.042 wt. percent each with a CPF of 0.70. Another portion of the 4.2 CPF catalyst was treated in exactly the same manner except that during the hydrogen contacting step a mixture of 10 percent hydrogen, 90 percent nitrogen was utilized. The dried, treated catalyst had an iron content of 0.061 weight percent, a nickel content of 0.043 weight percent, a vanadium content of 0.041 weight percent and a CPF of 0.8.

EXAMPLE XI

Another fresh silica-alumina catalyst which had been treated in a manner similar to that in Example IX such that it contained 0.17 weight percent iron and 0.6 weight percent nickel with a 3.4 CPF was subjected to cation exchange in the manner described in Example I at a pH of 3.0. The iron content of the dried treated catalyst was found to be 0.15 weight percent, the nickel content 0.052 weight percent, and the CPF 2.9. Another sample of the 3.4 CPF catalyst was subjected to hydrogen reduction, oxidation, and cation exchange as described in Example III with a pH of 3.0 during the cation exchange step. The dried, treated catalyst was found to have an iron content of 0.10 weight percent, a nickel content of 0.047 weight percent, and a CPF of 0.96, again demonstrating that the hydrogen reduction and oxidation steps are necessary to produce a maximum improvement in the hydrocarbon cracking characteristics of the catalyst.

EXAMPLE XII

Two runs were carried out on a semi-plant scale fluid catalytic cracking unit. A large sample of so-called plant equilibrium silica-alumina cracking catalyst was taken from an operating commercial fluid cracking unit. This catalyst, which contained approximately 13 weight percent alumina, 87 weight percent silica after being burned to remove all of the coke was elutriated to remove the fines so that a sample passing through a 100 mesh U.S. Standard Sieve but retained on a 325 U.S. Standard Sieve was obtained. This catalyst was placed in the semi-plant scale unit and subjected to the following cycle: nitrogen purge—10 minutes, reduced crude cracking—70 minutes (while being fluidized with nitrogen), steam stripping—10 minutes, regeneration with air to a coke level of 0.5 weight percent or less. The reduced crude was the same as that employed in Example IX. Each run consisted of 126 such cycles. During each day of operation approximately 13 percent of the total catalyst in the entire process was removed and, in the first run, cation exchanged in the same manner as described in Example I and then returned to the cracking process. In the second run, the same quantity of catalyst was removed each day but treated in the same manner as described in Example III utilizing hydrogen reduction and oxidation, but not water washing, prior to the cation exchange. The treated catalyst was then returned to the unit. In both experiments the pH of the aqueous medium during ion exchange was 2.85. At the end of the runs the total quantity of the oil that had been passed over the catalyst was 0.4 barrel per pound of catalyst. At the end of each run the CPF of the catalyst was determined and it was found that the second catalyst which had been subjected to hydrogen reduction and oxidation prior to cation exchange had a CPF of 1.2 units lower than the CPF of the catalyst of the first run, again showing the criticality of employing these treatments before the cation exchange.

EXAMPLE XIII

A sample of the standard deactivated and contaminated silica-alumina catalyst was treated in the same manner as described in Example III except that after the hydrogen reduction step it was cooled in air to room temperature. The pH of the cation exchange aqueous solution was 2.95 during the cation exchange step. The final treated catalyst had a nickel content of 0.31 weight percent and a CPF of 7.9 showing that sintering of the metal had taken place rendering it non-removable by cation exchange.

EXAMPLE XIV

A sample of the standard deactivated and contaminated silica-alumina catalyst utilized in Example III was hydrogen reduced for two hours at 950° F., cooled in nitrogen to room temperature and thereafter allowed to come into contact with air for several hours as described in Example III. The CPF of the catalyst thus treated was 18 showing that the hydrogen reduction and oxidation steps alone do not improve the hydrocarbon cracking characteristics of the catalyst.

This hydrogen reduced and oxidized catalyst was then continuously water washed with demineralized water at 200° F. for 16 hours. The nickel content of the catalyst at this stage was 0.49, showing that very little had been removed and, therefore, the sole function of the washing step is to remove highly acidic compounds from the catalyst which would lower the pH of the aqueous medium during cation exchange.

We claim:
1. A method for improving the product distribution resulting from a hydrocarbon catalytic cracking process in which is employed a silica-alumina cracking catalyst, which catalyst has become contaminated with coke-forming and gas-forming metallic impurities during use, which comprises
  (a) separating at least a portion of the total catalyst from the process,
  (b) contacting the contaminated catalyst at a temperature ranging from 900° F. to 1400° F. with a non-oxidizing gas containing free hydrogen whereby at least a portion of the metallic impurities are reduced to the metallic state,
  (c) contacting the hydrogen treated catalyst with a gas containing free oxygen at a temperature below about 750° F.
  (d) contacting the oxygen treated catalyst with a cation exchange resin in the hydrogen cycle in an aqueous medium at a pH such that the coke-forming and gas-forming metal contaminants are removed from the catalyst while the stability of the catalyst is substantially maintained,
  (e) separating the contacted catalyst from the resin, and
  (f) returning the contacted catalyst to the hydrocarbon cracking process.

2. The method according to claim 1 wherein the silica-alumina cracking catalyst is a synthetic catalyst and contains from 7 percent by weight to 30 percent by weight of alumina.

3. A method for improving the product distribution resulting from a hydrocarbon catalytic cracking process in which is employed a silica-alumina cracking catalyst, which catalyst has become contaminated with coke-forming and gas-forming metallic impurities during use, which comprises
  (a) separating at least a portion of the total catalyst from the process,
  (b) contacting the contaminated catalyst at a temperature ranging from 900° F. to 1400° F. with a non-oxidizing gas containing free hydrogen whereby at least a portion of the metallic impurities are reduced to the metallic state,
  (c) contacting the hydrogen treated catalyst with a gas containing free oxygen at a temperature below about 750° F.,
  (d) contacting the oxygen treated catalyst with a cation exchange resin in the hydrogen cycle in an aqueous medium at a pH ranging from 2.0 to 4.5 with a catalyst to resin ratio ranging from 0.25 gram to 3.0 grams per milliliter of wet cation exchange resin,
  (e) separating the contacted catalyst from the resin, and
  (f) returning the contacted catalyst to the hydrocarbon cracking process.

4. The method according to claim 3 wherein the silica-alumina cracking catalyst is a synthetic catalyst and contains from 7 percent by weight to 30 per cent by weight of alumina.

5. A method for improving the product distribution resulting from a hydrocarbon catalytic cracking process in which is employed a silica-alumina cracking catalyst, which catalyst has become contaminated with coke-forming and gas-forming metallic impurities during use, which comprises
  (a) separating at least a portion of the total catalyst from the process,
  (b) contacting the contaminated catalyst at a temperature ranging from 900° F. to 1400° F. with a non-oxidizing gas containing free hydrogen, whereby at least a portion of the metallic impurities are reduced to the metallic state,
  (c) contacting the hydrogen treated catalyst with a gas containing free oxygen at a temperature below about 750° F.
  (d) contacting the oxygen treated catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst to resin ratio ranging from 0.25 gram to 3.0 grams per milliliter of wet cation exchange resin,
  (e) separating the contacted catalyst from the resin, and
  (f) returning the contacted catalyst to the hydrocarbon cracking process.

6. The method according to claim 5 wherein the silica-alumina cracking catalyst is a synthetic catalyst and contains from 7 percent by weight to 30 percent by weight of alumina.

7. A method for improving the product distribution resulting from a hydrocarbon catalytic cracking process in which is employed a silica-alumina cracking catalyst, which catalyst has become contaminated with coke-forming and gas-forming metallic impurities during use, which comprises
  (a) separating at least a portion of the total catalyst from the process,
  (b) contacting the contaminated catalyst at a temperature ranging from 900° F. to 1400° F. with a non-oxidizing gas containing free hydrogen whereby at least a portion of the metallic impurities are reduced to the metallic state,
  (c) contacting the hydrogen treated catalyst with a gas containing free oxygen at a temperature below about 750° F.,
  (d) contacting the oxygen treated catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 3.0 grams per milliliter of wet cation exchange resin,
(e) separating the contacted catalyst from the resin, and
(f) returning the contacted catalyst to the hydrocarbon cracking process.

8. The method according to claim 7 wherein the silica-alumina cracking catalyst is a synthetic catalyst and contains from 7 percent by weight to 30 percent by weight of alumina.

9. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1400° F. with a non-oxidizing gas containing free hydrogen whereby at least a portion of the metallic impurities are reduced to the metallic state,
(b) contacting the hydrogen treated catalyst with a gas containing free oxygen at a temperature below about 750° F.,
(c) contacting the oxygen treated catalyst with a cation exchange resin in the hydrogen cycle in an aqueous medium at a pH such that the coke-forming and gas-forming metallic impurities are removed from the catalyst while the stability of the catalyst is substantially maintained,
(d) separating the catalyst from the resin, and
(e) drying the catalyst.

10. The method according to claim 9 wherein the silica-alumina cracking catalyst is a synthetic catalyst and contains from 7 percent by weight to 30 percent by weight of alumina.

11. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1400° F. with a non-oxidizing gas containing free hydrogen whereby at least a portion of the metallic impurities are reduced to the metallic state,
(b) contacting the hydrogen treated catalyst with a gas containing free oxygen at a temperature below about 750° F.,
(c) contacting the oxygen treated catalyst with a cation exchange resin in the hydrogen cycle in an aqueous medium at a pH ranging from 2.0 to 4.5 with a catalyst to resin ratio ranging from 0.25 gram to 3.0 grams per milliliter of wet cation exchange resin,
(d) separating the catalyst from the resin, and
(e) drying the catalyst.

12. The method according to claim 11 wherein the silica-alumina cracking catalyst is a synthetic catalyst and contains from 7 percent by weight to 30 percent by weight of alumina.

13. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1400° F. with a non-oxidizing gas containing free hydrogen whereby at least a portion of the metallic impurities are reduced to the metallic state.
(b) contacting the hydrogen treated catalyst with a gas containing free oxygen at a temperature below about 750° F.,
(c) contacting the oxygen treated catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst to resin ratio ranging from 0.25 gram to 3.0 grams per milliliter of wet cation exchange resin.
(d) separating the catalyst from the resin, and
(e) drying the catalyst.

14. The method according to claim 13 wherein the silica-alumina cracking catalyst is a synthetic catalyst and contains from 7 percent by weight to 30 percent by weight of alumina.

15. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1400° F. with a non-oxidizing gas containing free hydrogen whereby at least a portion of the metallic impurities are reduced to the metallic state,
(b) contacting the hydrogen treated catalyst with a gas containing free oxygen at a temperature below about 750° F.,
(c) contacting the oxygen treated catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 3.0 grams per milliliter of wet cation exchange resin,
(d) separating the catalyst from the resin, and
(e) drying the catalyst.

16. The method according to claim 15 wherein the silica-alumina cracking catalyst is a synthetic catalyst and contains from 7 percent by weight to 30 percent by weight of alumina.

References Cited by the Examiner

UNITED STATES PATENTS

| | | | |
|---|---|---|---|
| 2,575,258 | 11/51 | Corneil et al. | 252—417 |
| 3,041,270 | 6/62 | Leum et al. | 208—120 |

ALPHONSO D. SULLIVAN, *Primary Examiner.*